Patented Mar. 15, 1927.

1,621,121

UNITED STATES PATENT OFFICE.

OTTO LOWY, OF NEWARK, NEW JERSEY, ASSIGNOR, BY MESNE ASSIGNMENTS, TO STENECK TRUST COMPANY, TRUSTEE, OF HOBOKEN, NEW JERSEY, A BANKING CORPORATION OF NEW JERSEY.

ARSENICAL SOLUTIONS AND METHOD OF PREPARING SAME.

No Drawing. Application filed December 20, 1920. Serial No. 432,081.

My present invention relates to the preparation of solutions of arsenical compounds, particularly solutions of arsphenamine suitable for intravenous injection. It is an object of the present invention to provide an improved form of arsenical solution and improved methods of preparing the same, whereby arsenical solutions, particularly solutions of arsphenamine, preferably in the form of the di-sodium salt of arsphenamine, are obtained, which may readily and safely be administered, and which shall, by reason of certain peculiar and valuable properties possessed by them as a result, in part at least, of the mode of their preparation, largely eliminate a whole class of undesirable and often fatal results generally following the use of arsenical preparations, particularly solutions of arsphenamine such as the di-sodium salt of arsphenamine, as hitherto prepared and administered.

By way of example I shall, in the accompanying specification, describe in detail illustrative embodiments of the process and product of my invention, it being, however, understood, that my invention is not limited to such illustrative embodiments which are herein set forth for purposes of illustration only.

Referring more particularly to the illustrative embodiments of my invention herein set forth, it is to be noted that in the procedure hitherto followed in the preparation of arsenical solutions, particularly solutions of arsphenamine, such as the di-sodium salt of arsphenamine, for their administration by hypodermic injection, it has been customary, taking arsphenamine for example, to prepare a solution of this substance by dissolving the same in an aqueous solution and neutralizing or alkalinizing by the use of an aqueous solution of a caustic alkali, such as sodium hydroxide. The directions usually given require that the caustic alkali be added so as to be in slight excess, this slight excess being considered in the art clear indication of the complete neutralizing of the acid molecules of the arsphenamine, and the complete conversion of the same into the di-sodium salt. This mode of procedure is characterized by four phases: In phase A we have arsphenamine as yet unconverted and consisting of the di-hydrochloride of diamino-dioxy-arseno-benzol. This is readily soluble in water. Phase B is characterized by the temporary precipitation of the base of arsphenamine, namely, diamino-dioxy-arseno-benzol, which is insoluble in water, by the addition of a comparatively small amount of the aqueous solution of caustic soda. Phase C is characterized by the conversion of the arsphenamine base into the mono-sodium salt of arsphenamine by the addition of a greater amount of aqueous solution of caustic soda than is necessary to precipitate the base, but less than the amount necessary to produce the di-sodium salt. In this phase of the reaction, the mono-sodium salt exists probably in the condition of a colloidal suspension in the solvent, the mono-sodium salt not being readily soluble in water. Phase D is characterized by the production of the di-sodium salt of arsphenamine by the addition of a still further quantity of the aqueous solution of caustic soda in excess of what is required to produce the mono-sodium salt, and, as is generally recommended slightly in excess of what would ordinarily be required to convert the arsphenamine into the di-sodium salt. This analysis of the reaction applies also to the improved form of arsenical solution described and claimed in my co-pending application, Serial No. 432,082 filed December 20, 1920, which solution is characterized by being substantially gas-free, and particularly free from oxygen and containing an excess of alkali, generally amounting to from about one-third to about four gram-molecules of caustic alkali per gram-molecule of the di-sodium salt of arsphenamine.

I have discovered that there is an additional phase in the reaction analyzed above, which has hitherto not been suspected, and the failure to account for which has resulted in an inferior solution, the use of which is fraught with dangerous and often fatal results. I have discovered that as intermediate phases C and D, defined above, there is a further phase which may be called phase C—D, during which, even though there may be present in the solution enough caustic soda or other caustic alkali to bring about the complete conversion of the arsphenamine into the di-sodium salt, or even a considerable excess of caustic alkali over what is required to bring about such a conversion, a substantial amount of the mono-sodium salt formed during the intermediate reaction remains undissolved, and remains suspended as a colloid in the solution. The presence of this unconverted mono-sodium salt in the form of an insoluble colloid renders the administration of the arsenical solution in this condition dangerous, symptoms often following its administration which are closely analogous to the symptoms following the existence of an embolus in the circulatory system of the patient. Where the dose of arsenical solution containing a considerable amount of the undissolved mono-sodium salt is considerable, the patient to whom the solution is administered suffers an extremely unfavorable reaction, and often dies.

I have further discovered that if the arsenical solution, as the solution of arsphenamine, or of the di-sodium salt of arsphenamine, described above, is permitted to age, that is, if a necessary time factor is taken into consideration in the preparation of the arsenical solution, prior to its administration, the conversion of the arsphenamine into the di-sodium salt will become complete by the complete elimination of the mono-sodium salt by its conversion into the di-sodium salt. Under ordinary conditions this aging period, which may readily be determined by trial and experiment and by a microscopic examination of the resulting solution, is approximately equal to four hours.

I have further discovered that if the aging of the arsenical solution, in accordance with the foregoing procedure, is permitted to take place in the presence of air or other oxidizing agents, the arsenical solution will, though free from the undissolved mono-sodium salt, become so toxic, by reason of the oxidation of the arsphenamine, as to render the same wholly unfit for use. I have, however, found that if the aging is conducted under non-oxidizing conditions, as under a vacuum or under an inert gas, the final solution will have all the desirable properties of a gas-free, unoxidized solution of the di-sodium salt substantially free from the undesirable mono-sodium salt. In particular, if I treat the solution prepared in accordance with my co-pending application referred to above, according to the procedure of the present invention, that is, if I permit the solution of said co-pending application to age for about four hours, before administering the same, I obtain a solution which, while non-toxic and free from gas and oxidized components, is also free from the undesirable, undissolved mono-sodium salt. The resulting solution is of a degree of alkalinity corresponding to about one-third to about four gram-molecules of caustic alkali to a gram-molecule of arsphenamine. This corresponds to an addition to the di-hydrochloride of from about four and one-third to about eight gram-molecules of caustic soda to a gram-molecule of di-hydrochloride. The solution is prepared under non-oxidizing conditions, as by being prepared under a vacuum, or under an inert gas, such as nitrogen. The aging may take place under similar conditions before sealing in an ampule, or, and preferably, by sealing the solution under a vacuum or under an inert gas, such as nitrogen, and permitting the same to age the desired time before administering the same by hypodermic injection.

I have further discovered that the excess of alkali which I prefer to use in preparing my solution greatly facilitates the conversion of the residue of mono-sodium salt into the di-sodium salt. While this conversion apparently proceeds much more quickly in the presence of air than when air is excluded, the presence of air or other oxidizing agent, as already set forth above, results in the oxidation of the arsenical compound and consequently in the increased toxicity of such compound to the point often of rendering the same totally unfit for use. I have further discovered that where the amount of free alkali present in the solution above the quantity necessary to produce the di-sodium salt is considerably in excess of such quantity, the conversion of the mono-sodium into the di-sodium salt is apparently less complete. This, however, is a feature which may be readily controlled by trial and experiment, especially since within the limits of free alkali specified in this specification the conversion is complete and the ultimate solution free from any undesirable properties of the kind discussed in this specification.

It is of course to be understood that my invention is not to be limited to the particular embodiments herein set forth for purposes of illustration only.

What I claim is:

1. The method which comprises adding to an arseno-benzol derivative an amount of caustic alkali at least sufficient to convert an arseno-benzol derivative into a solution of the di-alkali salt, and thereafter permitting the resulting solution to age in the absence of oxygen for a length of time sufficient to cause the reaction resulting in the formation of the di-alkali salt to become complete.

2. The method which comprises adding to an arseno-benzol derivative under oxygen-free conditions an amount of caustic alkali at least sufficient to convert an arseno-benzol derivative into a solution of the di-alkali salt, and thereafter permitting the resulting solution to age in the absence of oxygen for a length of time sufficient to cause the reaction resulting in the formation of the di-alkali salt to become complete.

3. The method which comprises adding to arseno-benzol derivative caustic soda substantially in excess of the amount required to convert the arseno-benzol derivative into a solution of the di-sodium salt, and thereafter permitting the resulting solution to age in the absence of oxygen for a length of time sufficient to cause the reaction resulting in the formation of the di-sodium salt to become complete.

4. The method which comprises adding to arseno-benzol derivative under oxygen-free conditions caustic soda substantially in excess of the amount required to convert the arseno-benzol derivative into a solution of the di-sodium salt, and thereafter permitting the resulting solution to age in the absence of oxygen for a length of time sufficient to cause the reaction resulting in the formation of the di-sodium salt to become complete.

5. The method which comprises adding to the di-hydrochloride of diamino-dioxy-arseno-benzol an amount of caustic alkali at least sufficient to convert said di-hydrochloride into a solution of the di-alkali salt, and thereafter permitting the resulting solution to age under non-oxidizing conditions for a length of time sufficient to permit a conversion of substantially all of the mono-alkali salt formed as an intermediate product of the reaction into di-alkali salt.

6. The method which comprises adding to the di-hydrochloride of diamino-dioxy-arseno-benzol under non-oxidizing conditions an amount of caustic alkali at least sufficient to convert said di-hydrochloride into a solution of the di-alkali salt, and thereafter permitting the resulting solution to age under non-oxidizing conditions for a length of time sufficient to permit a conversion of substantially all of the mono-alkali salt formed as an intermediate product of the reaction into the di-alkali salt.

7. The method which comprises adding to the di-hydrochloride of diamino-dioxy-arseno-benzol from about four and one-third to about eight gram-molecules of caustic soda, being an amount of caustic alkali substantially in excess of the amount required to convert said di-hydrochloride into a solution of the di-sodium salt, and thereafter permitting the resulting solution to age under non-oxidizing conditions for a length of time sufficient to permit a conversion of substantially all of the mono-sodium salt formed as an intermediate product of the reaction into di-sodium salt.

8. The method which comprises adding to the di-hydrochloride of diamino-dioxy-arseno-benzol under non-oxidizing conditions from about four and one-third to about eight gram-molecules of caustic soda, being an amount of caustic alkali substantially in excess of the amount required to convert said di-hydrochloride into a solution of the di-sodium salt, and thereafter permitting the resulting solution to age under non-oxidizing conditions for a length of time sufficient to permit a conversion of substantially all of the mono-sodium salt formed as an intermediate product of the reaction into the di-sodium salt.

9. The method of manufacturing a prophylactic compound which comprises adding to arsphenamine an amount of caustic alkali at least sufficient to convert the arsphenamine into a solution of the di-alkali salt, and closing said solution in an ampule under non-oxidizing conditions.

10. The method of manufacturing a prophylactic compound which comprises adding to arsphenamine an amount of caustic alkali at least sufficient to convert the arsphenamine into a solution of the di-alkali salt, and sealing the same in an ampule in the presence of nitrogen.

11. The method of manufacturing a prophylactic which comprises adding to arsphenamine under oxygen-free conditions, an amount of caustic alkali at least sufficient to convert the arsphenamine into a solution of the di-alkali salt, and closing said solution in an ampule under non-oxidizing conditions.

12. The method of manufacturing a prophylactic which comprises adding to arsphenamine under oxygen-free conditions, an amount of caustic alkali at least sufficient to convert the arsphenamine into a solution of the di-alkali salt, and sealing the same in an ampule in the presence of nitrogen.

13. The method which comprises adding to the di-hydrochloride of diamino-dihydroxy-arseno-benzol an amount of caustic alkali at least sufficient to convert said di-hydrochloride into a solution of di-alkali salt, sealing said solution in an ampule under non-oxidizing conditions, and permitting the same to age until all of the mono-alkali salt formed as an intermediate product is converted into the di-alkali salt.

14. The method which comprises adding to the di-hydrochloride of diamino-dihydroxy-arseno-benzol an amount of caustic alkali at least sufficient to convert said di-hydrochloride into a solution of di-alkali salt, sealing said solution in an ampule in the presence of inert gas, and permitting the same to age until all of the mono-alkali salt formed as an intermediate product is converted into the di-alkali salt.

15. The method which comprises adding to the di-hydrochloride of diamino-dihydroxy-arseno-benzol an amount of caustic alkali at least sufficient to convert said di-hydrochloride into a solution of di-alkali salt, sealing said solution in an ampule in the presence of nitrogen, and permitting the same to age until all of the mono-alkali salt formed as an intermediate product is converted into the di-alkali salt.

16. The method which comprises adding to the di-hydrochloride of diamino-dihydroxy-arseno-benzol from about four and one-third to about eight gram-molecules of caustic soda, sealing the resulting solution in an ampule in the presence of inert gas, and permitting the same to age in said ampule until all of the mono-sodium salt formed as an intermediate product of the reaction is converted into the di-sodium salt.

17. The method which comprises adding to the di-hydrochloride of diamino-dihydroxy-arseno-benzol from about four and one-third to about eight gram-molecules of caustic soda, sealing the resulting solution in an ampule in the presence of nitrogen, and permitting the same to age in said ampule until all of the mono-sodium salt formed as an intermediate product of the reaction is converted into the di-sodium salt.

18. The method which comprises adding to the di-hydrochloride of diamino-dihydroxy-arseno-benzol under non-oxidizing conditions from about four and one-third to about eight gram-molecules of caustic soda, sealing the resulting solution in an ampule under non-oxidizing conditions, and permitting the same to age until all of the mono-sodium salt formed as an intermediate product of the reaction is converted into the di-sodium salt.

19. The method which comprises adding to the di-hydrochloride of diamino-dihydroxy-arseno-benzol under non-oxidizing conditions from about four and one-third to about eight gram-molecules of caustic soda, sealing the resulting solution in an ampule in the presence of nitrogen, and permitting the same to age until all of the mono-sodium salt formed as an intermediate product of the reaction is converted into the di-sodium salt.

In testimony whereof, I have signed my name to this specification this 17th day of December, 1920.

OTTO LOWY.